United States Patent
Sonoda et al.

(10) Patent No.: US 9,884,954 B2
(45) Date of Patent: *Feb. 6, 2018

(54) RANDOM MAT AND FIBER-REINFORCED COMPOSITE MATERIAL SHAPED PRODUCT

(71) Applicant: Teijin Limited, Osaka-shi, Osaka (JP)

(72) Inventors: Naoaki Sonoda, Matsuyama (JP); Yuhei Konagai, Matsuyama (JP); Katsuyuki Hagihara, Matsuyama (JP)

(73) Assignee: Teijin Limited, Osaka-Shi, Osaka (JP)

( * ) Notice: Subject to any disclaimer, the term of this patent is extended or adjusted under 35 U.S.C. 154(b) by 124 days.

This patent is subject to a terminal disclaimer.

(21) Appl. No.: 14/417,189

(22) PCT Filed: Jul. 25, 2013

(86) PCT No.: PCT/JP2013/070242
§ 371 (c)(1),
(2) Date: Jan. 26, 2015

(87) PCT Pub. No.: WO2014/017612
PCT Pub. Date: Jan. 30, 2014

(65) Prior Publication Data
US 2015/0203663 A1    Jul. 23, 2015

(30) Foreign Application Priority Data
Jul. 26, 2012   (JP) ................ 2012-165871

(51) Int. Cl.
*C08K 7/02* (2006.01)
*C08J 5/04* (2006.01)
(Continued)

(52) U.S. Cl.
CPC ............... *C08K 7/06* (2013.01); *C08J 5/047* (2013.01); *D04H 1/4218* (2013.01);
(Continued)

(58) Field of Classification Search
CPC .......... C08K 7/02; C08J 5/047; D04H 1/4218
See application file for complete search history.

(56) References Cited

U.S. PATENT DOCUMENTS

| 6,025,285 A | 2/2000 | Vyakarnam et al. |
| 6,066,395 A | 5/2000 | Miyoshi et al. |
| 2014/0080961 A1 | 3/2014 | Konagai et al. |

FOREIGN PATENT DOCUMENTS

| JP | H06320538 A | 11/1994 |
| JP | H1181146 A | 3/1999 |

(Continued)

OTHER PUBLICATIONS

Dec. 17, 2015—(EP) Third Party Observation—App 13822161.9.
(Continued)

*Primary Examiner* — Bijan Ahvazi
*Assistant Examiner* — Thuy-Al N Nguyen
(74) *Attorney, Agent, or Firm* — Banner & Witcoff, Ltd.

(57) ABSTRACT

A random mat contains reinforcing fibers having an average fiber length of 3 to 100 mm and a thermoplastic resin, the reinforcing fiber contains reinforcing fiber bundle (A) defined as the bundle composed of the reinforcing fibers of a critical number of single fiber (defined by the following formula (1)) or more, an average thickness of the reinforcing fiber bundles (A) is 100 μm or less, and the number (n) of the reinforcing fiber bundles (A) per unit weight (g) of the reinforcing fibers satisfies the following formula (I): Critical number of single fiber=600/D (1) (wherein D is the average fiber diameter (μm) of the reinforcing fiber), and $0.65 \times 10^4/L < N$ (I) (wherein L is the average fiber length (mm) of the reinforcing fiber).

10 Claims, 3 Drawing Sheets (51) Int. Cl.
*C08K 7/06* (2006.01)
*D04H 1/4218* (2012.01)
*D04H 1/4242* (2012.01)
*D04H 1/4342* (2012.01)
*D04H 1/587* (2012.01)

(52) U.S. Cl.
CPC ......... *D04H 1/4242* (2013.01); *D04H 1/4342* (2013.01); *D04H 1/587* (2013.01)

(56) References Cited

FOREIGN PATENT DOCUMENTS

| JP | 2002-097375 A | 4/2002 |
|---|---|---|
| JP | 4161409 B2 | 10/2008 |
| JP | 2009-062648 A | 3/2009 |
| JP | 2009-114611 A | 5/2009 |
| JP | 2011-178890 A | 9/2011 |
| JP | 2011-178891 A | 9/2011 |
| JP | 2014-210991 A | 11/2014 |

OTHER PUBLICATIONS

Vyakamam, Murty, N. and Drzal, Lawrence T., "Novel Processing and Preformance of Aligned Discontinuous Fiber Polymer Composites," Jun. 18, 1996, Annual Technical Conference & Exhibition (ANTEC) pp. 2531-2535.

Harper, Lee T., Turner, Thomas A., and Warrior, Nicholas A., "A Random Fibre Network Model for Predicting the Stochastic Effects of Discontinuous Fibre Composites," Jul. 13, 2007, 16th International Conference on Composite Materials, pp. 1-10.

Pimenta, Soraia and Pinho, Silvestre T., "The influence of micromechanical properties and reinforcement architecture of the mechanical response of recycled composites," Composites: Part A 56 (2014) 213-225.

Oct. 22, 2013—International Search Report—Intl App PCT/JP2013/070242—English Translation.

Harper, L.T. et al., Composites: Part A vol. 38 (2007), pp. 755-770, "Characterisation of random carbon fibre compsites from a directed fibre preforming process: The effect of tow filamentisation".

Jespersen, S.T. et al., Polymer Composites (2010), "Consolidation of Net-Shape Random Fiber Thermoplastic Composite Preforms".

Oct. 10, 2013—(PCT) International Preliminary Report on Patentability—App PCT/JP2013/070242—Eng Tran.

Nov. 23, 2016—(EP) Office Action—App 13822161.9.

Mulligan, D.R., Ogin, S.L., Smith, P.A., Wells, G.M., and Worrall, C.M., "Fibre-bundling in a short-fibre composite: 1. Review of literature and development of a method for controlling the degree of bundling," Composites Science and Technology 63 (2003) 715-725.

Mar. 8, 2017—(JP) Information Offer and Concise Statement—App 2014-527017.

Publication 4 cited in Mar. 8, 2017 Information Offer in Japanese Patent Application No. 2014-527017.

Publication 5 cited in Mar. 8, 2017 Information Offer in Japanese Patent Application No. 2014-527017.

RANDOM MAT AND FIBER-REINFORCED COMPOSITE MATERIAL SHAPED PRODUCT

CROSS REFERENCE TO RELATED APPLICATIONS

This is a U.S. National Phase Application under 35 U.S.C. § 371 of International Application No. PCT/JP2013/070242, filed Jul. 25, 2013, which claims priority to Japanese Patent Application No. 2012-165871, filed Jul. 26, 2012, the entire disclosures of which are incorporated herein by reference.

TECHNICAL FIELD

The present invention relates to a random mat used as an intermediate material for a fiber-reinforced composite material shaped product and a fiber-reinforced composite material obtained from that. The present invention is to provide a fiber-reinforced composite material shaped product which is not aligned in a specific direction in an in-plane direction and exhibits isotropy, excellent mechanical strength, and above all, an excellent development rate of a reinforcing function even if it is thin-walled, and more particularly, a carbon-fiber-reinforced composite material shaped product.

BACKGROUND ART

As a preform of a fiber-reinforced composite material (hereinafter abbreviated as a composite material in some cases) using a carbon fiber, an aramid fiber, a glass fiber and the like as a reinforcing fiber, a random mat exhibiting isotropy is used because of formability and ease of process steps. This random mat can be obtained by a spray-up method (dry type) in which a cut reinforcing fiber alone or a thermosetting resin is sprayed simultaneously to a shaping-mold or a method (wet type) in which a reinforcing fiber cut in advance is added to slurry containing a binder and subjected to papermaking.

As a means for improving mechanical properties of the composite material, an increase of a reinforcing fiber volume content ratio (Vf) is known, but in the case of the random mat using cut fibers, it has been difficult to increase the reinforcing fiber volume content ratio due to reasons such as presence of fibers oriented in the three-dimensional direction, frequent entanglement of fibers and the like. Moreover, when the random mat is used, since the fibers are discontinuous compared to the case in which continuous fibers are used, strength of the reinforcing fibers cannot be sufficiently developed, and there was a problem that a development rate of strength of the reinforcing fiber after being made into a shaped product was 50% or less of a theoretical value. Non-Patent Literature 1 discloses a composite material made from a carbon fiber random mat including a thermosetting resin as a matrix. The development rate of strength such a composite material is approximately 44% of the theoretical value.

Moreover, a conventional composite material including a thermosetting resin as a matrix is obtained by heating/pressing for 2 hours or more an intermediate material called prepreg obtained by impregnating in advance a reinforcing fiber base material with a thermosetting resin using an autoclave. Recently, an RTM molding method in which a reinforcing fiber base material not impregnated with a resin is set in a metal mold and then, the thermosetting resin is poured is proposed, and molding time has been drastically reduced, but even if the RTM molding method is used, 10 minutes or more are required for molding one component.

Thus, a composite including a thermoplastic resin as a matrix instead of the conventional thermosetting resin attracts attention.

In a thermoplastic stamping molding (TP-SMC) (Patent Literature 1) including a thermoplastic resin as a matrix, a chopped fiber impregnated with a thermoplastic resin in advance is heated to a melting point or more, the impregnated chopped fiber is fed into a part of a mold, the mold is tightened immediately, and the fiber and the resin are made to flow inside the mold to obtain a product shape followed by cooling/molding. Using this method, molding in a short time of approximately 1 minute is possible by using a fiber impregnated with a resin in advance. This is a method of using a molding material called SMC, a stampable sheet and the like, and with such thermoplastic stamping molding, the fiber and the resin are made to flow inside the mold, which is associated with problems such that a thin-walled article cannot be prepared, fiber alignment is disturbed and cannot be controlled easily and the like.

Moreover, in Patent Literature 2, by forming a reinforcing fiber bundle into a parallelogram, a load borne by a chopped fiber bundle can be released from an edge portion of the reinforcing fiber to the periphery little by little toward the farthest portion in a fiber alignment direction, and a fiber-reinforced thermoplastic resin shaped product having excellent mechanical strength in which stress concentration is less likely to occur is proposed, while Patent Literature 3 proposes a stampable sheet which has improved wettability and adhesion on an interface between a reinforcing fiber bundle and a matrix resin, and excellent mechanical strength and molding fluidity by setting an aspect ratio of a section perpendicular to a bundle fiber axis of the reinforcing fiber bundle at 4 or more in a horizontal direction to 1 in a vertical direction.

CITATION LIST

Patent Literature

Patent Literature 1: Japanese Patent No. 4161409
Patent Literature 2: Japanese Patent Laid-Open No. 2009-114611
Patent Literature 3: Japanese Patent Laid-Open No. 6-320538

Non-Patent Literature

Non-Patent Literature 1: Composites Part A 38 (2007) P. 755 to 770

SUMMARY OF INVENTION

Technical Problem

However, in the above described conventional technology, a fiber-reinforced composite material which exhibits isotropy, excellent tensile strength, and high development rate of strength has not been examined.

An object of the present invention is to provide a fiber-reinforced composite material shaped product which exhibits isotropy, excellent mechanical strength, and high development rate of strength and a random mat used as an intermediate material thereof. Particularly, the present invention is to provide a fiber-reinforced composite material shaped product obtained from the random mat and the fiber-reinforced composite material shaped product which exhibits less thickness unevenness of a fiber-reinforced mat contained and being excellent development rate of a reinforcing function even if it is thin-walled one.

Solution to Problem

The present inventors have found that a fiber-reinforced composite material shaped product which exhibits excellent mechanical strength and its isotropy can be provided from a random mat constituted by a thermoplastic resin and a reinforcing fiber which satisfies a specific opening state and completed the present invention. In more detail, they have found that, by having a large number of fine reinforcing fiber bundles contained, a uniform random mat which has more closely filled the reinforcing fibers (bundles) and has smaller gaps can be obtained as compared with the case where a smaller number of fine reinforcing fiber bundles are used, and the fiber-reinforced composite material shaped product which has no deterioration of physical properties caused by a defect, uniform mechanical strength, excellent tensile strength and high development rate of strength can be provided by the random mat. Moreover, the present inventors have also found that, in the random mat and the fiber-reinforced composite material shaped product, if a length of the reinforcing fiber contained and the number of specific reinforcing fiber bundles in the reinforcing fiber (the number per unit weight of the reinforcing fibers) have a specific relationship, the fiber-reinforced composite material shaped product has the preferable properties listed above.

That is, the present invention is the random mat constituted by reinforcing fibers having an average fiber length of 3 mm to 100 mm and a thermoplastic resin, wherein a thickness of a reinforcing fiber bundle (A) composed of the reinforcing fibers of a critical number of single fiber (defined by formula (1)) or more is 100 μm or less, a number (n) of the reinforcing fiber bundles (A) per unit weight (g) of the reinforcing fibers satisfies formula (I) below, and a fiber-reinforced composite material shaped product obtained by molding that.

$$\text{Critical number of single fiber}=600/D \tag{1}$$

(wherein D is an average fiber diameter (μm) of single reinforcing fibers)

$$0.65\times10^4/L<n \tag{I}$$

(wherein L is the average fiber length (mm) of single reinforcing fibers)

Advantageous Effects of Invention

According to the present invention, the fiber-reinforced composite material shaped product which exhibits high mechanical strength, excellent isotropy, and high development rate of strength can be obtained. Moreover, the fiber-reinforced composite material shaped product obtained by the present invention can be made thin-walled and thus it can be used for various component members, for example, internal plates, external plates, and component members of an automobile, and frames, housings and the like of various electrical products and machines.

DESCRIPTION OF EMBODIMENTS

An embodiment of the present invention will be sequentially explained below. In the present invention, the term "weight" means "mass".

[Random Mat]

A random mat of the present invention is constituted by reinforcing fibers having an average fiber length of 3 to 100 mm and a thermoplastic resin, an average thickness of a reinforcing fiber bundle (A) defined as the bundle composed of the reinforcing fibers of a critical number of single fiber (defined by formula (1)) or more is 100 μm or less, and the number (n) of the reinforcing fiber bundle (A) per unit weight (g) of the reinforcing fibers satisfies formula (I).

$$\text{Critical number of single fiber}=600/D \tag{1}$$

(wherein D is the average fiber diameter (μm) of single reinforcing fibers)

$$0.65\times10^4/L<n \tag{I}$$

(wherein L is the average fiber length (mm) of single reinforcing fibers)

The random mat of the present invention is constituted by the reinforcing fibers and the thermoplastic resin and is preferably constituted by a reinforcing fiber mat composed of the reinforcing fibers and the thermoplastic resin. The reinforcing fiber mat referred to in the present invention is in a planar body (mat-shaped article) not including a thermoplastic resin as a matrix but composed of discontinuous reinforcing fibers. Regarding the reinforcing fiber mat relating to the present invention, the reinforcing fiber may include a sizing agent or a small amount of binder for forming a mat, and it is preferable that the mat has the reinforcing fibers oriented in random directions in a plane and has physical properties in vertical and lateral directions in the plane, which are substantially equal.

Types of the reinforcing fibers are not particularly limited and the fibers may be one type or a mixture of two or more types.

The random mat of the present invention is constituted by bundles of the reinforcing fiber (reinforcing fiber bundles) and may have a form where the reinforcing fiber mat in which the reinforcing fiber bundles and the single fibers of the reinforcing fibers are mixed contains the thermoplastic resin. In the random mat of the present invention, since the thickness of the reinforcing fiber bundles is small and presence of a large number of fine bundles per unit weight (g) of the reinforcing fibers enables thickness unevenness of the reinforcing fiber mat constituting the random mat to be made small, the fiber-reinforced composite material which has excellent mechanical properties can be obtained by molding even if it is thin-walled one. The above reinforcing fiber bundles and the single fibers of the reinforcing fibers are preferably made into this form by opening or cutting reinforced fiber strands as described later. Here, the reinforcing fiber strand is a bundle of long reinforcing fibers bundling, for example, approximately 1000 or more of reinforcing fiber filaments (single fibers).

In the plane of the random mat, the reinforcing fibers are not aligned in a specific direction but arranged in a dispersed manner in random directions. The random mat of the present invention is an in-plane isotropic material. When the shaped product is obtained by processing the random mat, isotropy of the reinforcing fibers in the random mat is maintained also in the shaped product. When obtaining the shaped product from the random mat, isotropy of the random mat and the shaped product made from that can be quantitatively evaluated by determining a ratio of tensile modulus in two directions orthogonal to each other. It is assumed to have isotropy if the ratio obtained by dividing the larger one of the modulus in the two directions in the shaped product obtained from the random mat by the smaller one does not exceed 2. If the ratio does not exceed 1.3, isotropy is rated as excellent.

The random mat of the present invention includes the reinforcing fiber having an average fiber length of 3 to 100 mm and the thermoplastic resin as described above, and the reinforcing fiber is preferably made into a mat-shaped article, that is, a reinforcing fiber mat including the thermoplastic resin. In the random mat of the present invention, the form in which the reinforcing fiber mat includes the thermoplastic resin may be the reinforcing fiber mat including the thermoplastic resin in a powder form, a fiber form or a lump form, the reinforcing fiber mat may be held by the thermoplastic resin as a matrix, or the thermoplastic resin in a sheet form or a film form may be mounted or layered on the reinforcing fiber mat. The thermoplastic resin in the random mat may be in a molten state. It is needless to say that, when acquiring the average thickness of the reinforcing fiber bundle (A) defined as the bundle composed of the reinforcing fibers of the critical number of single fiber or more and the number (n) of the reinforcing fiber bundles (A) per unit weight (g) of the reinforcing fibers in the reinforcing fiber mat constituting the random mat of the present invention, those values can be considered those of the random mat.

The random mat may be used as a preform to obtain the fiber-reinforced material shaped product in a final form (hereinafter referred to simply as a shaped product in some cases) or may be used to obtain the shaped product in the final form after impregnation of the thermoplastic resin by heating or the like so as to be made into a prepreg. The random mat of the present invention includes the above described prepreg in which the thermoplastic resin has been impregnated.

The shaped product in the final form here refers to a shaped product obtained by pressing/heating a random mat or a shaped plate thereof, and not to a shaped product obtained by further heating or pressing (further molding) the shaped product, melting the thermoplastic resin which is a matrix, and molding into other shape or thickness.

Therefore, if articles obtained by pressing/heating the random mat and the like are cut into other shapes, grounded to be thinned, made thick by applying resins or the like, they are the shaped products in the final form since they are not heated/pressed. Use of heat as a means for cutting or machining does not fall under the heating here.

Moreover, when the random mat into which the thermoplastic resin in the molten state is supplied is to be molded, if molding is performed with the supplied thermoplastic resin being still in the molten state, the shaped product can be obtained by molding only with pressing, for example.

[Reinforcing Fiber]

The reinforcing fibers included in the random mat are discontinuous and characterized in that the reinforcing function is exhibited by including reinforcing fibers of length to some extent. The fiber length of the reinforcing fibers used in the present invention is expressed by an average fiber length obtained by measuring the fiber length of the reinforcing fiber in the random mat obtained. As a method for measuring the average fiber length, a method of measuring the fiber length of 100 randomly extracted fibers to the unit of 1 mm by using a caliper or the like and of calculating the average can be cited.

The average fiber length of the reinforcing fibers in the random mat of the present invention is 3 mm or more and 100 mm or less, preferably 5 mm or more and 100 mm or less, more preferably 5 mm or more and 80 mm or less, further preferably 8 mm or more and 60 mm or less, and much further preferably 10 mm or more and 30 mm or less. The type of distribution of the fiber lengths may be unimodal or a mixture of two modes or more.

In the preferable cutting method of the reinforcing fibers described later, if the random mat is manufactured by cutting the reinforcing fibers to a fixed length, the fixed length can be considered the average fiber length.

In the random mat of the present invention, the average thickness of the reinforcing fiber bundles (A) is 100 μm or less. If the average thickness exceeds 100 μm, the thickness unevenness of the reinforcing fiber mat contained in the random mat becomes large, and impregnation of the resin into the fiber bundles becomes difficult and thus, it is difficult to obtain the fiber-reinforced composite material having excellent mechanical properties.

As the average thickness of the reinforcing fiber bundles (A) in the present invention, it is preferable that a plurality of samples of the reinforcing fiber bundle (A) are collected from the random mat and an average value thereof is calculated by the following formula based on the thickness ($t_i$) of each of the reinforcing fiber bundles (A), the weight ($W_i$) of each of the reinforcing fiber bundles (A), and the total weight ($W_A = \Sigma W_i$) of the reinforcing fiber bundles (A):

$$\text{Average thickness } t = \Sigma(t_i \times W_i / W_A)$$

A range of the average thickness of the reinforcing fiber bundles (A) is preferably 20 to 75 μm, more preferably 20 to 60 μm, and particularly preferably 30 to 50 μm.

The number (n) of the reinforcing fiber bundles (A) per unit weight (g) of the reinforcing fibers in the random mat satisfies the following formula (I):

$$0.65 \times 10^4 / L < n \tag{I}$$

(wherein L is the average fiber length (mm) of single reinforcing fibers).

Specifically, if the average fiber length of the reinforcing fibers is 30 mm, the number (n) of the reinforcing fiber bundles (A) per gram of the reinforcing fibers becomes larger than 216.

The number (n) of the reinforcing fiber bundles (A) per unit weight (g) of the reinforcing fibers preferably satisfies the following formula (I-2);

$$1.2 \times 10^4 / L < n < 18.0 \times 10^4 / L \tag{I-2}$$

(wherein L is the average fiber length (mm) of single reinforcing fibers).

If the number (n) of the reinforcing fiber bundles (A) satisfies the formula (I-2) or specifically, if the average fiber length of the reinforcing fiber is 30 mm, the number (n) of the reinforcing fiber bundles (A) per gram of the reinforcing fibers is less than 6000 and larger than 400.

More preferably, the number (n) of the reinforcing fiber bundles (A) per unit weight (g) of the reinforcing fibers in the random mat satisfies the following formula (I-3):

$$1.5 \times 10^4 / L < n < 12.0 \times 10^4 / L \tag{I-3}$$

(wherein L is the average fiber length (mm) of single reinforcing fibers).

The number (n) of the reinforcing fiber bundles (A) per unit weight (g) of the reinforcing fibers can be determined in the following manner: A random mat specimen having a size of approximately 100×100 mm, for example, is cut out and the number (ni) of the reinforcing fiber bundles (A) and the fiber length (Li (mm)) of the reinforcing fiber bundles in the specimen are measured. Then, the number (n) is determined from the total weight (W(g)) of the reinforcing fibers based on the following formula:

$$n=\Sigma(n_i \times L_i/L)/W$$

(wherein L is the average fiber length (mm) of single reinforcing fibers).

When the specimen is cut out of the random mat, the reinforcing fiber bundles (A) shorter than the original length (average fiber length) in the random mat formed by cutting of some of the reinforcing fiber bundles (A) are present in the specimen. In the formula described above, the number (n) of the reinforcing fiber bundles (A) is calculated after converting the number of short reinforcing fiber bundles (A) to the number corresponding to the number of those having the average fiber length by using a ratio of the length of the short reinforcing fiber bundle to the original average fiber length. For example, assuming that in specimen cut out of the random mat having the average fiber length (L) of the reinforcing fiber bundle (A) of 20 mm, 100 pieces of the reinforcing fiber bundle (A) having the fiber length 5 mm, 50 pieces of the reinforcing fiber bundle (A) having the fiber length of 10 mm, 30 pieces of the reinforcing fiber bundle (A) having the fiber length of 15 mm, and 20 pieces of the reinforcing fiber bundle (A) having the fiber length of 20 mm are observed, and the weight of the total reinforcing fibers is W(g), the number (n) of the reinforcing fiber bundles (A) can be calculated according to the formula:

$$n=\{(100 \times 5/20)+(50 \times 10/20)+(30 \times 15/20)+(20 \times 20/20)\}/W$$

The reinforcing fibers are preferably at least one type selected from a group consisting of a carbon fiber, an aramid fiber, and a glass fiber. As the reinforcing fiber constituting the random mat, carbon fiber is preferable since it is light-weighted but can provide a composite material having excellent strength. As the carbon fiber, a polyacrylonitrile-based carbon fiber (hereinafter abbreviated as PAN-based carbon fiber in some cases), petroleum pitch-based carbon fiber, coal pitch-based carbon fiber, rayon-based carbon fiber, cellulose-based carbon fiber, lignin-based carbon fiber, phenol-based carbon fiber, vapor-phase growth based carbon fiber and the like are known in general, and any of these carbon fibers can be favorably used in the present invention, and particularly the PAN-based carbon fiber is preferable, and these carbon fibers may be used singly in one type or may be used as a mixture of a plurality of types. The reinforcing fibers used in the random mat in the present invention may be a carbon fiber alone or may be those containing a glass fiber, an aramid fiber and the like in addition to the carbon fiber for giving impact resistance and the like. In the case of the carbon fiber, the average fiber diameter is preferably 1 to 50 μm, more preferably 3 to 12 μm, further preferably 5 to 9 μm, and most preferably 5 to 7 μm.

The random mat is useful as an intermediate material, and various fiber areal weights can be selected in accordance with desired molding. The fiber areal weight of the reinforcing fiber in the random mat is not particularly limited but it is preferably 25 to 10000 g/m², more preferably 25 to 4000 g/m², and further preferably 600 to 3000 g/m². The carbon fiber to which a sizing agent is applied is preferably used, and the sizing agent is preferably used in more than 0 to 10 weight parts with respect to 100 weight parts of the carbon fiber.

[Opening Degree]

The random mat of the present invention preferably has, with regard to a ratio of the reinforcing fiber bundle (A) defined as the bundle composed of the reinforcing fibers of the critical number of single fiber (defined by the following formula (1)) or more to the total amount of fibers in the mat, a value of 20 vol % or more, more preferably 30 vol % or more, further preferably 40 vol % or more and particularly preferably 50 vol % or more:

$$\text{Critical number of single fiber}=600/D \qquad (1)$$

(wherein D is the average fiber diameter (μm) of single reinforcing fibers).

In the mat, single fibers or fiber bundles composed of the reinforcing fibers of the number of single fibers less than the critical number of single fiber may be present as the reinforcing fibers other than the reinforcing fiber bundle (A). In the random mat of the present invention, since the thickness unevenness of the reinforcing fiber mat constituting the random mat can be made smaller by reducing the thickness of the reinforcing fiber bundle (A) defined as the bundle composed of the reinforcing fibers of a specific single fiber number or more and by setting the number of the reinforcing fiber bundle (A) per unit weight (g) of the reinforcing fibers to a specific range, the fiber-reinforced composite material having excellent mechanical properties, even in being thin-walled, can be obtained by molding.

If the ratio of the reinforcing fiber bundles (A) to the total amount of fibers is 20 vol % or more, the fiber-reinforced composite material having a high reinforcing fiber volume content ratio can be obtained by molding the random mat of the present invention, which is preferable. On the other hand, the upper limit of the ratio of the reinforcing fiber bundles (A) is preferably 99 vol %. If the ratio of the reinforcing fiber bundles (A) to the total amount of fibers is 99 vol % or less, a gap between the fibers does not become large, and a composite material having excellent mechanical strength can be obtained. The ratio of the reinforcing fiber bundles (A) is more preferably 50 vol % or more and less than 99 vol %. The upper limit of the ratio of the reinforcing fiber bundles (A) to the total amount of fibers is more preferably 95 vol % of less and further preferably 90 vol % or less.

As a preferable specific method of limiting the number (n) of the reinforcing fiber bundles (A) per unit weight (g) of the reinforcing fibers, the average thickness of the reinforcing fiber bundles (A), and the ratio of the reinforcing fiber bundles (A) to the above described ranges, a method of control by adjusting the size of the fiber bundles supplied to the cutting step or by adjusting, for example, the width of the bundles or the number of fibers per width in a preferable manufacturing method described later can be cited. Specifically, there may be cited a method in which fiber bundles are thinned by enlarging the bundle width by widening and the like and supplied to a cutting step, or a method in which a slit step is performed before the cutting step. Moreover, the slit step may be performed at the same time with the cutting step. A preferable method will be described in the explanation of the cutting step. A method of using a pre-widened fiber for the reinforcing fiber to be used can be cited, and preferable conditions will be described in the explanation of the cutting step. Moreover, by using the reinforcing fiber bundles to which an appropriate sizing agent and an appropriate sizing amount are applied, adjustment of the number (n) of the reinforcing fiber bundles (A) per unit weight (g) of the reinforcing fibers in the above described step can be performed more precisely.

[Matrix Resin]

The matrix resin included in the random mat of the present invention is a thermoplastic resin. The kinds of the thermoplastic resins include, for example, a vinyl chloride resin, a vinylidene chloride resin, a vinyl acetate resin, a polyvinyl alcohol resin, a polystyrene resin, an acrylonitrile-styrene resin (AS resin), an acrylonitrile-butadiene-styrene resins (ABS resin), an acrylic resin, a methacrylic resin, a polyethylene resin, a polypropylene resin, a polyamide 6 resin, a polyamide 11 resin, a polyamide 12 resin, a polyamide 46 resin, a polyamide 66 resin, a polyamide 610 resin, a polyacetal resin, a polycarbonate resin, a polyethylene terephthalate resin, a polyethylene naphthalate resin, a polybutylene naphthalate resin, a polybutylene terephthalate resin, a polyarylate resin, a polyphenylene ether resin, a polyphenylene sulfide resin, a polysulfone resin, a polyethersulfone resin, a polyether ether ketone resin, a polylactic acid resin and the like.

These thermoplastic resins may be used alone, two types or more may be used at the same time, a plurality of types may be mixed and used or they may be used as a copolymer.

The amount of the thermoplastic resin present is preferably 10 to 800 weight parts with respect to 100 weight parts of the reinforcing fibers. More preferably, the thermoplastic resin is 30 to 800 weight parts with respect to the 100 weight parts of the reinforcing fibers, further preferably 50 to 600 weight parts, and particularly preferably the thermoplastic resin is 50 to 300 weight parts.

A quantity relationship between the reinforcing fibers and the thermoplastic resin can be also defined by the reinforcing fiber volume content ratio (hereinafter abbreviated as Vf in some cases) defined by the following formula:

Reinforcing fiber volume content ratio (vol %)=100×[volume of reinforcing fibers/(volume of reinforcing fibers+volume of thermoplastic resin)]

This reinforcing fiber volume content ratio (Vf) and the amount of the thermoplastic resin present expressed by the weight parts to the 100 weight parts of the reinforcing fibers described above can be converted to each other by using the density of the reinforcing fibers and the density of the thermoplastic resin.

Moreover, the random mat of the present invention may contain additives of various fibrous or non-fibrous filler of organic fibers or inorganic fibers, flame retardant, UV resistance agent, pigment, parting agent, softener, plasticizer, and surfactant in a range not hindering the object of the present invention.

[Fiber-Reinforced Composite Material Shaped Product]

Regarding the random mat of the present invention, the reinforcing fibers contained are long with the average fiber length of 3 mm or more, and particularly when it is in a form in which single fibers and fiber bundles are mixed, it also has a feature that formability is high. Thus, the random mat of the present invention can be preferably used as an intermediate material for obtaining the fiber-reinforced composite material shaped product.

That is, the fiber-reinforced composite material shaped product can be obtained by molding the random mat of the present invention, and the present invention includes the fiber-reinforced composite material shaped product.

The fiber-reinforced composite material shaped product of the present invention contains reinforcing fibers having the average fiber length of 3 to 100 mm and a thermoplastic resin, wherein, preferably, the reinforcing fibers are such that the average thickness of the reinforcing fiber bundles (A) each composed of the critical number of single fiber (defined by the following formula (1)) or more, that is, composed of the critical number of single fiber or more of single fibers is 100 μm or less and the number (n') of the reinforcing fiber bundles (A) per unit weight (g) of the reinforcing fibers satisfies the following formula (II), and the amount of the thermoplastic resin present is 10 to 800 weight parts with respect to 100 weight parts of the reinforcing fibers:

Critical number of single fiber=600/D  (1)

(wherein D is the average fiber diameter (μm) of single reinforcing fibers).

$0.65 \times 10^4/L < n'$  (II)

(wherein L is the average fiber length (mm) of single reinforcing fibers).

In the fiber-reinforced composite material shaped product of the present invention, the number (n') of the reinforcing fiber bundles (A) per unit weight (g) of the reinforcing fibers preferably satisfies the following formula (II-2) and more preferably satisfies the following formula (II-3):

$1.2 \times 10^4/L < n' < 18.0 \times 10^4/L$  (II-2)

$1.5 \times 10^4/L < n' < 12.0 \times 10^4/L$  (II-3)

(wherein L is the average fiber length (mm) of single reinforcing fibers).

The opening degree of the reinforcing fibers in the fiber-reinforced composite material shaped product is substantially maintained at the same state as in the random mat. Regarding the reinforcing fibers in the fiber-reinforced composite material shaped product, the ratio of the reinforcing fiber bundles (A) and the number (n') of the reinforcing fiber bundles (A) per unit weight (g) of the reinforcing fibers in the above described range can be favorably adjusted by controlling the ratio of the reinforcing fiber bundles (A) and the number (n) of the reinforcing fiber bundle (A) per unit weight (g) of the reinforcing fibers in the random mat.

The thickness of the fiber-reinforced composite material shaped product depends upon the fiber areal weight and the amount of thermoplastic resin in the random mat, and the thickness in the fiber-reinforced composite material shaped product in an appropriate range can be favorably adjusted by controlling the fiber areal weight and the amount of thermoplastic resin.

The types of the reinforcing fibers contained in the fiber-reinforced composite material shaped product are not particularly limited, and those listed in the explanation of the reinforcing fibers of the random mat are preferably cited.

The types of the thermoplastic resins contained in the fiber-reinforced composite material shaped product are not particularly limited, and those listed in the explanation of the matrix resin of the random mat are preferably cited.

The amount of the thermoplastic resin present in the fiber-reinforced composite material shaped product is preferably 10 to 800 weight parts, more preferably 30 to 800 weight parts, further preferably 50 to 600 weight parts, and particularly preferably 50 to 300 weight parts with respect to 100 weight parts of the reinforcing fibers.

The shape of the fiber-reinforced composite material shaped product in the present invention is not particularly limited. The shape may be, for example, a sheet form or a plate form, may have a curved surface part, may have a rising surface part having a section of a T-shape, an L-shape, a U-shape, a hat-shape or the like or may be a three-dimensional shape including them.

The fiber-reinforced composite material shaped product of the present invention can have a variety of thickness such as a thickness from 0.2 to 100 mm, for example, and even a thinner shaped product can have extremely favorable physical properties and appearances. Specifically, the thickness of the shaped product can be 0.2 to 2.0 mm (if it is necessary to specify extremely strictly, a thickness at 25° C.).

A fiber areal weight of the reinforcing fibers in the fiber-reinforced composite material shaped product is not particularly limited and can be selected as appropriate, but from the viewpoint of obtaining a thin-walled shaped product, it is preferably 25 to 10000 $g/m^2$, more preferably 25 to 4000 $g/m^2$, and further preferably 600 to 3000 $g/m^2$.

The present invention also includes a layered body including at least one type of the fiber-reinforced composite material shaped product of the present invention as a core material or a skin layer. The layered body of the present invention may further include at least one type of unidirectional fiber-reinforced composite material in which continuous reinforcing fibers are aligned in one direction as a core material or a skin layer. The layered body of the present invention may also include at least one type of the fiber-reinforced composite material shaped product other than the fiber-reinforced composite material shaped product of the present invention or the unidirectional fiber-reinforced composite material as a core material or a skin layer.

[Manufacturing Method of Random Mat]

The random mat of the present invention can be obtained by layering a sheet-shaped or a film-shaped thermoplastic resin on a reinforcing fiber mat, or it may be favorably manufactured by steps 1 to 3 below:

1. A step of cutting the reinforcing fibers;
2. A spraying step of introducing the cut reinforcing fibers into a pipe and conveying them by air; and
3. A step of fixing the sprayed reinforcing fibers so as to obtain a random mat.

[Cutting Step]

Figure 1:
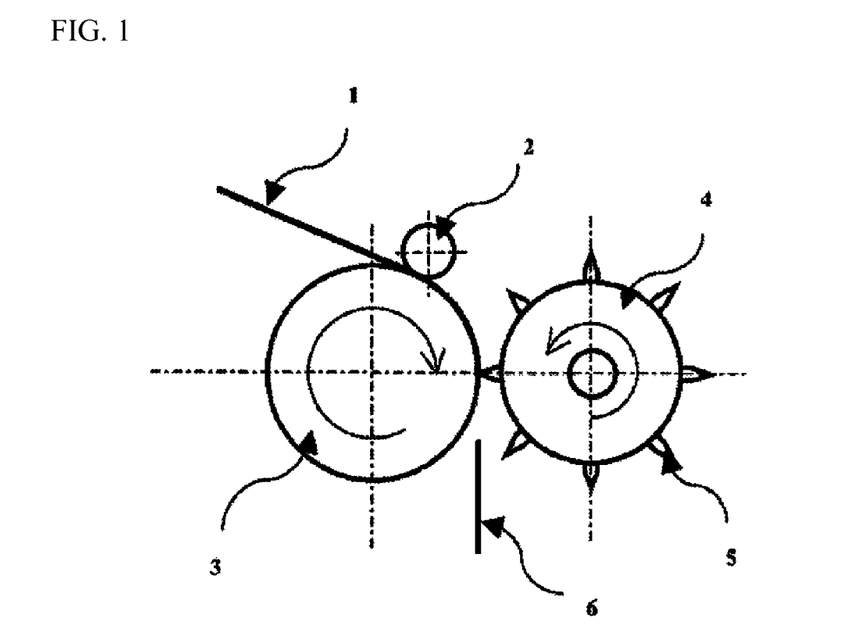
FIG. 1 is a schematic view of an example of a cutting process using a rotary cutter.
Figure 2:
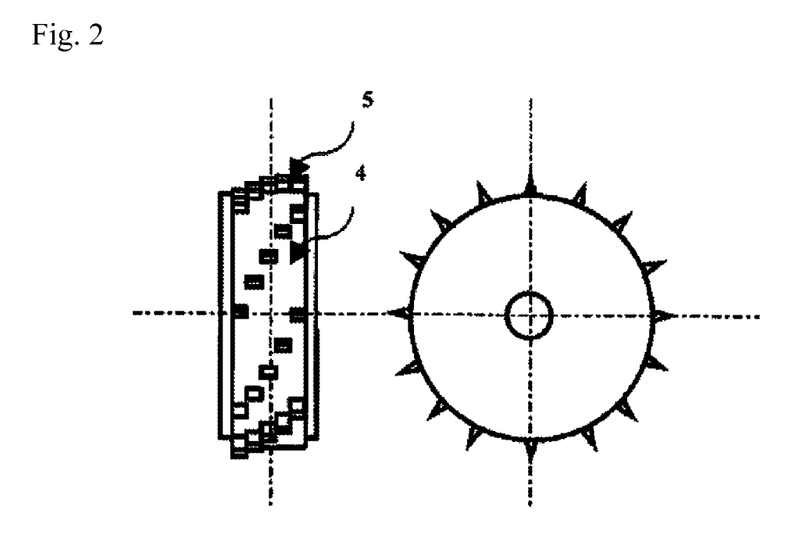
FIG. 2 is a schematic view illustrating outlines of a front and a section of the example of a preferable rotary separating cutter.
Figure 3:
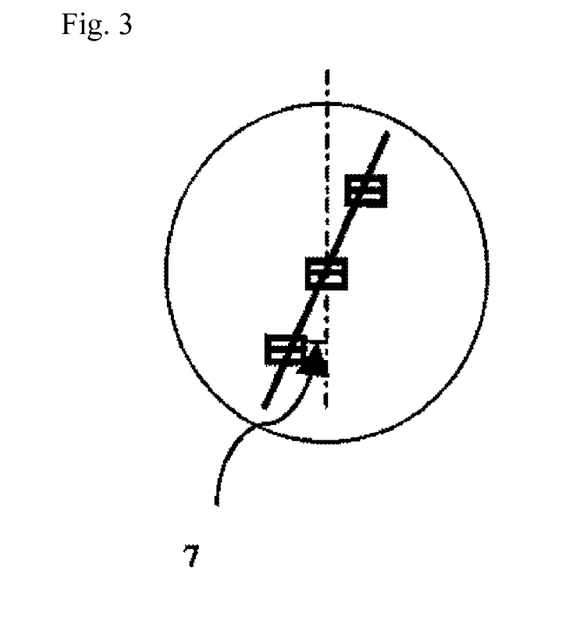
FIG. 3 is a schematic view illustrating a knife angle of the example of the preferable rotary separating cutter.

The step of cutting the reinforcing fibers will be described. As the reinforcing fibers to be cut, those in a form in which long-fiber of single fibers are bundled, so-called strands can be easily available and handled, which is preferable. A cutting method of the reinforcing fibers is a step of cutting the reinforcing fibers by preferably using a knife such as a rotary cutter or the like. An example of the cutting step using the rotary cutter is illustrated in FIG. 1. As the rotary cutter, a separating cutter which separates the fiber bundles to approximately ½ to ¹⁄₂₀ and then cuts them is more preferably used. A preferable example of the rotary separating cutter is illustrated in FIG. 2 as schematic views of a front and a section and an explanatory view of a knife angle in FIG. 3. The rotary separating cutter has a plurality of blades arranged at equal intervals and spirally along a main body.

In a method of cutting and spraying the fiber bundles like a conventional cutter, fiber areal weight unevenness and thickness unevenness of the fibers are large, and it is difficult to obtain an intermediate material which is thin and has excellent physical properties. By cutting the fiber bundles while separating them into finer bundles, uniformity is improved, and the random mat and the fiber-reinforced composite material shaped product of the present invention can be favorably obtained. The knife angle for continuously cutting the reinforcing fibers is not particularly limited, and a general knife having a blade at 90 degrees to the fiber or having a different angle may be used.

The random mat of the present invention is characterized in that the thickness of the fiber bundles is small and there are many fine bundles per unit weight (g) of the reinforcing fibers as described above, and the pre-widened reinforcing fibers or a strand having a small fiber-bundle thickness by enlarging the width of the reinforcing fiber is preferably used and supplied to the cutting step. In the present invention, to enlarge the width of the fiber bundle so as to make it thin as above is called widening.

A method for widening the fibers is not particularly limited, and a method of pressing fibers by using an expansion spreader or a projecting pin, for example, a method in which the fibers are deflected in a curved manner toward a downwind direction by having an air flow pass through in a direction across a traveling direction of the fibers, a method of giving vibration and the like can be cited.

The fibers are preferably widened and separated into groups of fiber bundles having fewer filaments. A method for separating fibers is not particularly limited, and a method of separating a strand into fine bundles by using a slitter, for example, can be cited. Moreover, by selecting a sizing agent of the reinforcing fibers and by performing separation, the reinforcing fiber bundles having an intended quantity of the average number of the fibers can also be obtained more easily.

By performing fiber separation subsequently to the fiber widening as above, the reinforcing fiber bundles can be made thinner and smaller in size so that the number (n) of the reinforcing fiber bundles (A) per unit weight (g) of the reinforcing fibers can be increased. Thus, uniformity of the reinforcing fibers contained in the random mat is improved, and a random mat having reduced thickness unevenness of the fibers and excellent mechanical properties can be obtained.

[Spraying Step]

Subsequently, a step of introducing the cut reinforcing fibers into a pipe downstream of the cutter and conveying them by air and spraying them is performed. Here, by directly blowing compressed air to the reinforcing fiber bundles, the fiber bundles can be opened further into finer fiber bundles and single fibers. The degree of opening can be controlled as appropriate by a pressure and the like of the compressed air. The reinforcing fibers conveyed are preferably sprayed onto a breathable sheet provided at a bottom part of a spraying device. Also, for a fixation step described below, the reinforcing fibers are preferably sprayed onto a movable breathable sheet having a suction mechanism.

Moreover, in the spraying step, by simultaneously spraying the fibrous or powdery thermoplastic resin onto the sheet, a random mat containing the reinforcing fibers and the thermoplastic resin can be favorably obtained.

[Step of Forming Random Mat]

Subsequently, a random mat is obtained by fixing the sprayed reinforcing fibers. Specifically, a method for obtaining a random mat in which the sprayed reinforcing fibers are fixed by suctioning air from beneath the breathable sheet is preferable. Even when the fibrous or powdery thermoplastic resin is simultaneously sprayed together with the reinforcing fibers, the thermoplastic resin is fixed in association with the reinforcing fibers.

[Manufacture of Fiber-Reinforced Composite Material Shaped Product]

Moreover, the fiber-reinforced composite material shaped product can be obtained by molding the random mat. As a method for obtaining the fiber-reinforced composite material shaped product, a method can be cited, in which, after obtaining the random mat by spraying the reinforcing fibers, the random mat is joined with a thermoplastic resin in a film form or a molten state, and the joined mat is heated/pressed by a press or the like. The fiber-reinforced composite material shaped product can also be obtained similarly by first spraying the fibrous and/or particulate thermoplastic resin together with the reinforcing fibers to fabricate a random mat containing the thermoplastic resin and the reinforcing fibers, which is then heated/pressed by using a press or the like. A method of obtaining the fiber-reinforced composite material shaped product is not particularly limited, and molding by vacuum molding, liquid-pressure molding, hot press, cold press and the like is suitably performed. Among them, the fiber-reinforced composite material shaped product of the present invention is suitably obtained by cold-press molding in which the thermoplastic resin is heated to its melting point or glass transition temperature or more and then, it is sandwiched by a mold held at the melting point or at the glass transition temperature or less of the resin so as to obtain the shape.

When the random mat is to be molded, if the matrix thermoplastic resin is crystalline, it is preferably heated to the melting point or more in advance or if the thermoplastic resin is non-crystalline, it is preferably heated to the glass transition point or more in advance. The temperature of a pressing medium may be adjusted to the melting point or glass transition point or more of the matrix thermoplastic resin or may be adjusted to the melting point or glass transition point or less. Moreover, by adding the thermoplastic resin during molding as appropriate, a shaped product having a different thickness according to purpose can be obtained. The thermoplastic resin to be added is not particularly limited, and specific examples include those described in to the explanation of the matrix resin. Also, the form of the resin may be a molten resin, a fibrous resin, a powdery resin, a film-shaped resin and the like.

Moreover, the fiber-reinforced composite material shaped product may be obtained, instead of directly molding the random mat, by first fabricating a plate-shaped intermediate by heating, pressing, and the like, which is then molded using any one of the methods such as those described above.

When the fiber-reinforced composite material shaped product is obtained from a random mat by the above described manufacturing method or the like, the ratio of the reinforcing fiber bundles (A) to the total amount of the reinforcing fibers, the average fiber number (N) and the average thickness of the reinforcing fiber bundles (A), the thickness unevenness of the reinforcing fiber mat and the like in the random mat are maintained in the reinforcing fibers in the fiber-reinforced composite material shaped product. Also, regarding the composition and the reinforcing-fiber volume content ratio (Vf), the values of either one of the random mat or the fiber-reinforced composite material shaped product can be substantially considered as the values of the other unless addition of the reinforcing fibers or thermoplastic resin is made during molding.

EXAMPLES

Examples are illustrated below, but the present invention is not limited by them. Unless specifically noted otherwise, the unit of length of the fiber bundles (fiber length) is mm and the unit of weight is g for the reinforcing fiber bundle (A) and their samples. Values of the density of the carbon fiber and thermoplastic resin used in the following examples and comparative examples are as follows:

PAN-based carbon fiber "Tenax" (registered trademark) STS40-24K: 1.75 g/cm$^3$
PAN-based carbon fiber "Tenax" (registered trademark) UTS50-24K: 1.79 g/cm$^3$
PAN-based carbon fiber "Tenax" (registered trademark) HTS40-12K: 1.76 g/cm$^3$
Polycarbonate: 1.20 g/cm$^3$
Polypropylene: 0.91 g/cm$^3$
Polybutylene terephthalate: 1.31 g/cm$^3$.

[Method for Determining the Ratio of Reinforcing Fiber Bundles (A) to the Total Amount of Reinforcing Fiber in Reinforcing Fiber Mat or Random Mat]

From a reinforcing fiber mat or a random mat (hereinafter abbreviated as a random mat or the like), a specimen having a size of 100 mm×100 mm is cut out, and all the reinforcing fiber bundles are removed by tweezers. The length ($L_i$) and the weight ($W_i$) of each of all the reinforcing fiber bundles are measured and recorded. Small reinforcing fiber bundles that cannot be taken out by the tweezers are collected and the weight thereof is measured lastly ($W_k$). At this time, a balance capable of measuring up to 1/100 mg is used. The critical number of single fiber is calculated from the fiber diameter (D) of the reinforcing fibers used in the random mat or the like, and the reinforcing fiber bundles are classified to the reinforcing fiber bundles (A) having the reinforcing fibers of the critical number of single fiber or more and the others. If two types or more of the reinforcing fibers are used, classification is performed for each type of the fibers, and measurement and evaluation are made for each.

After measurement of all the classified bundles is completed, the ratio (VR) of the reinforcing fiber bundles (A) to the total amount of fiber in the random mat or the like can be determined by the following formula (4) by using the specific fiber weight of the reinforcing fibers ($\rho$(g/cm$^3$)):

$$VR=\Sigma(W_i/\rho)\times 100/((W_k+\Sigma W_i)/\rho) \qquad (4)$$

If the reinforcing fibers and the thermoplastic resin cannot be separated, and the above measurement cannot be made easily, the thermoplastic resin is removed by heating at 500° C. for approximately 1 hour, or the like and then, the above described measurement is made.

[Method for Determining the Ratio of Reinforcing Fiber Bundles (A) to the Total Amount of Reinforcing Fiber in the Fiber-Reinforced Composite Material Shaped Product]

Regarding the ratio of the reinforcing fiber bundles (A) in the fiber-reinforced composite material shaped product, a specimen of a fiber-reinforced composite material shaped product is cut out to have a size of 100 mm×100 mm, the thermoplastic resin is removed by placing in a furnace at 500° C. for approximately 1 hour and then, the fiber bundles are taken out, and the measurement is made similarly to the procedure in the random mat or the like.

[Method for Determining the Average Fiber Length L in the Reinforcing Fiber Mat or Random Mat]

From a reinforcing fiber mat or the random mat, 100 pieces of the reinforcing fibers are taken out at random by using tweezers, and the individual fiber length $L_i$ is measured and recorded up to 1 mm by using a caliper. The reinforcing fibers are preferably taken out from an area having a sufficiently large size compared to the fiber length.

The average fiber length L is determined by the following formula from the individual fiber length $L_i$ obtained:

$$L=\Sigma L_i/100$$

If the reinforcing fibers and the thermoplastic resin cannot be separated, and the above measurement cannot be made easily, the thermoplastic resin is removed by heating at 500°

C. for approximately 1 hour, or the like and then, the above described measurement is made.

[Measurement of the Number of Bundles (n) of Reinforcing Fiber Bundle (A) Defined as the Bundle Composed of the Reinforcing Fibers of the Critical Number of Single Fiber or More Per Gram of the Reinforcing Fibers in Random Mat or the Like]

A specimen of approximately 100 mm×100 mm is cut out of the random mat or the like, and the weight (W) of the total reinforcing fibers of the specimen is measured. If the reinforcing fibers and the thermoplastic resin cannot be separated from each other, the specimen is heated for several tens of minutes to several hours at a decomposition temperature or higher of the matrix resin, for example, and measurement is made after the thermoplastic resin is decomposed and removed.

All the reinforcing fiber bundles are taken out of the specimen by the tweezers, the critical number of single fiber is calculated from the fiber diameter (D) of the reinforcing fibers used in the random mat, the fiber length ($L_i$) and the number ($n_i$) of bundles in the specimen of the reinforcing fiber bundle (A) defined as the bundle composed of reinforcing fibers of the critical number of single fiber or more are measured and recorded.

If two types or more of the reinforcing fibers are used, classification is performed for each type of the fibers, and measurement is made for each. The number (n) of the reinforcing fiber bundles (A) per unit weight (g) of the reinforcing fibers in the random mat is determined by the following formula from the number ($n_i$) and the fiber length ($L_i$ (mm)) of the reinforcing fiber bundles, and the fiber weight (W(g)):

$$n = \Sigma(n_i \times L_i/L)/W$$

(wherein L is the average fiber length (mm) of single reinforcing fibers).

When the specimen is cut out, if the reinforcing fiber bundle (A) shorter than the average fiber length are formed, in the above formula, the number of those short reinforcing fiber bundles (A) is converted to the number of the reinforcing fiber bundle (A) having the average fiber length and then, the number (n) of the reinforcing fiber bundles (A) per unit weight (g) of the reinforcing fibers is calculated.

[Measurement of the Number of Bundles (n') of Reinforcing Fiber Bundle (A) Defined as the Bundle Composed of Reinforcing Fibers of the Critical Number of Single Fiber or More Per Gram of Reinforcing Fibers in Fiber-Reinforced Composite Material Shaped Product]

From a composite material shaped product, a specimen having a size of 100 mm×100 mm is cut out and heated at the decomposition temperature or more of the matrix resin for several tens of minutes to several hours, the fiber weight is measured after the thermoplastic resin is decomposed and removed. Subsequently, measurement is made similarly to the random mat or the like.

[Measurement of the Thickness of Reinforcing Fiber Bundle in Random Mat or the Like]

The measurement of the average thickness (t) of the reinforcing fiber bundles (A) in the random mat or the like was made in accordance with the following procedure.

1) From a random mat or the like, a specimen having a size of 100 mm×100 mm is cut out, and approximately 20 pieces of the reinforcing fiber bundles are taken out at random by tweezers. The critical number of single fiber is calculated from the average fiber diameter (D) of the reinforcing fibers used in the random mat or the like, and 20 pieces of the reinforcing fiber bundle (A) defined as the bundle composed of the reinforcing fibers of the critical number of single fiber or more are extracted from the fiber bundles taken out. The weight ($W_i$) of each of the reinforcing fiber bundles (A) is measured by the procedure similar to the above described procedure for determining the ratio of the reinforcing fiber bundles (A) to the total amount of reinforcing fibers.

2) By using a micrometer which can measure up to $\frac{1}{1000}$ mm, the fiber bundle thickness ($t_i$) of the reinforcing fiber bundle (A) defined as the bundle composed of the reinforcing fibers of the critical number of single fiber or more is measured.

3) The measurement described above is made five times or more in the random mat or the like, and the average value is calculated by the following formula from the thickness ($t_i$) of the reinforcing fiber bundles (A), the weight ($W_i$) of the reinforcing fiber bundles (A), and the total weight ($W_A = \Sigma W_i$) of the reinforcing fiber bundles (A).

$$\text{Average thickness } t = \Sigma(t_i \times W_i/W_A)$$

If two types or more of the reinforcing fibers are used, classification is performed for each type of the fibers, and measurement is made for each.

If the reinforcing fibers and the thermoplastic resin cannot be separated, and the above measurement cannot be made easily, the thermoplastic resin is removed by heating at 500° C. for approximately 1 hour, or the like and then the measurement described above is made.

[Method for Measuring the Thickness Unevenness of Reinforcing Fiber Mat in Random Mat or the Like]

The coefficient of variation (CV) of the thickness of the reinforcing fiber mat in the random mat or the like is calculated by the following procedure, from which the thickness unevenness is evaluated. It is assumed that the larger the coefficient of variation CV (%) is, the larger the variation in the thickness of the reinforcing fiber mat is.

If the thermoplastic resin cannot be separated from the random mat and the thickness unevenness of the reinforcing fiber mat cannot be measured, the measurement is made after the thermoplastic resin is heated and removed similar to the case of the fiber-reinforced composite material shaped product described below.

1) From a random mat or the like, a specimen having a size of 100 mm×100 mm is cut out, and is separated from the thermoplastic resin and put in a sealable bag and the pressure is reduced to −0.09 MPa or less.

2) Marking in the form of a lattice is put on top of the bag at intervals of 10 mm, and the thickness is measured by a micrometer up to $\frac{1}{1000}$ mm. The measurement is performed at 25 points of a lattice of 5 rows×5 lines.

3) The thickness of the bag is subtracted from the measured thickness, an average value and a standard deviation are calculated, and the coefficient of variation CV of the thickness of the reinforcing fibers is calculated by the following formula (5):

$$\text{Coefficient of variation CV (\%)} = (\text{standard deviation}/\text{average value}) \times 100 \quad (5)$$

[Method for Measuring the Thickness Unevenness of Reinforcing Fiber Mat in Fiber-Reinforced Composite Material Shaped Product]

When the thickness unevenness of the reinforcing fiber mat of the fiber-reinforced composite material shaped product is to be evaluated, a specimen of a flat plate-shaped fiber-reinforced composite material shaped product is cut out to have a size of 100 mm×100 mm, and the thermoplastic resin is removed in a furnace heated at 500° C. for approximately 1 hour. After that, the dimensions and the weight are measured similarly and the mat is placed on a smooth flat plate. After that, the mat together with the flat plate was put in a sealable bag, and the thickness was measured. The measurement was performed at 25 points similarly to the procedure in the random mat or the like except that the thicknesses of the bag and the flat plate are subtracted from the measured thickness, and the coefficient of variation CV of the thickness was determined.

[Evaluation of Impregnation Degree of Thermoplastic Resin of Fiber-Reinforced Composite Material Shaped Product (Shaped Plate)]

The impregnation degree of the fiber-reinforced composite material shaped product (shaped plate) is evaluated by an ultrasonic flaw detection test. Evaluation was made by performing a flaw detection test by using an ultrasonic flaw detection imaging equipment (SDS-WIN manufactured by Krautkramer Japan Co., Ltd.,) under the conditions including a flaw detector frequency at 5 MHz and a scanning pitch of 2.0 mm×2.0 mm. In making evaluation, microscopic observation was conducted on a cross-section of a portion indicating reflected-wave intensity of 90% or more, and absence of defects or gaps was confirmed. In the flaw detection test, it is assumed that the larger an areal ratio of a portion having high reflected-wave intensity is (70% or more in this example), the denser the inside of the shaped plate is, and the impregnation degree of the thermoplastic resin in the shaped plate is higher. On the other hand, it is assumed that the larger the areal ratio of a portion having low reflected-wave intensity is (50% or less in this example), there are fine gap portions inside the shaped plate, and the shaped plate has more non-impregnated portions.

[Tensile Test]

A specimen was cut out of the fiber-reinforced composite material shaped product (shaped plate) by using a water jet, and a tensile strength and a tensile modulus were measured by using a universal tester manufactured by Instron Corporation by referring to JIS K7164. A shape of the specimen was 1B-type B-form test piece. An inter-chuck distance was 115 mm, and a test speed was 10 mm/minute. The specimen was cut out each in an arbitrary direction (0-degree direction) of the shaped product and in a direction orthogonal to that (90-degree direction), and the tensile strength and the tensile modulus were measured in both directions. Moreover, regarding the tensile modulus, a ratio (Eδ) was calculated by dividing the larger value by the smaller value.

[Calculation of the Development Rate of Physical Properties with Respect to the Theoretical Strength]

The development rate of physical properties (%) with respect to the theoretical strength was determined by the following calculation from the tensile strength of the shaped plate obtained by the procedure described above and the tensile strength of the reinforcing fiber (carbon fiber) contained in the shaped plate:

Development rate of physical properties (%)=(Tensile strength of shaped product/theoretical strength of shaped product)×100

Here, the theoretical strength of the shaped product was obtained according the following formula by the law of mixture of the strength of a composite material from the tensile strength ($F_f$) of the reinforcing fibers contained in the shaped product, stress ($\sigma_m$) of the matrix resin at fracture, the reinforcing fiber volume content ratio (Vf), and an alignment coefficient of the fiber ($\eta_\theta$):

Theoretical strength of shaped product (MPa)=($\eta_\theta \times F_f \times Vf$)+$\sigma_m(1-Vf)$ (wherein $\eta_\theta = 3/8$ in-plane random alignment was used for the alignment coefficient $\eta_\theta$.)

Example 1

As a reinforcing fiber, the PAN-based carbon fiber "Tenax" (registered trademark) manufactured by Toho Tenax Co., Ltd., STS40-24KS strand (fiber diameter: 7 μm, fiber width: 10 mm, tensile strength: 4000 MPa) was used after widened to the width of 30 mm. The widened reinforcing fiber strand was slit at an interval of 1 mm by using a separating device made of cemented carbide and further cut by using a rotary cutter made of a cemented carbide having blades disposed at an interval of 30 mm as a cutting device to prepare fibers having the length of 30 mm. By placing a tapered tube beneath the rotary cutter, the cut reinforcing fibers were conveyed to the tapered tube by flowing compressed air at 80 m/s. As a matrix resin, polycarbonate powder pulverized and classified to an average grain diameter of 500 μm (L-1225Y, "Panlite" (registered trademark), manufactured by Teijin Chemicals Ltd.) was supplied from a side of the tapered tube. Subsequently, by installing a movable conveyor net at the bottom of outlet of the tapered tube, and supplying the reinforcing fibers to the net while performing suction by a blower set below the net, a random mat having a fiber areal weight of 2800 g/m² was obtained. A form of the reinforcing fibers in the random mat was observed, and fiber axes of the reinforcing fibers were substantially parallel to the plane and were dispersed at random in the plane.

The average fiber length of the reinforcing fiber of the random mat obtained was 30 mm. The critical number of single fiber defined by the formula (1) was 86, and the average thickness of the reinforcing fiber bundle (A) defined as the bundle composed of the reinforcing fibers of the critical number of single fiber or more was 38 μm. Moreover, the number (n) of the reinforcing fiber bundle (A) defined as the bundle composed of the reinforcing fibers of the critical number of single fiber or more per gram of the reinforcing fibers in the random mat was 1120. Furthermore, in this random mat, the ratio of the reinforcing fiber bundles (A) to the total amount of the reinforcing fiber was 90 vol %.

The obtained random mat was heated at 2.0 MPa for 10 minutes in a press device heated to 300° C. so as to obtain a shaped plate having a thickness of 4.0 mm. Moreover, the number (n') of the reinforcing fiber bundle (A) defined as the bundle composed of the reinforcing fibers of the critical number of single fiber or more per gram of the reinforcing fibers in the shaped plate was 1150. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 40 vol %, and the coefficient of variation CV of the thickness was shown to be 5.1% according to the evaluation of the thickness unevenness of the reinforcing fiber mat in the shaped plate. Further, the results of evaluation of the tensile properties made according to JIS 7164 indicated that the tensile strength was 460 MPa, and the development rate of physical properties with respect to the theoretical strength was 76%. Moreover, the tensile modulus ratio between the 0-degree direction and the 90-degree direction was 1.06.

Example 2

As a reinforcing fiber, the PAN-based carbon fiber "Tenax" (registered trademark) manufactured by Toho Tenax Co., Ltd., UTS50-24K strand (fiber diameter: 6.9 μm, fiber width: 10 mm, tensile strength: 5000 MPa) was used after widened to the width of 24 mm. The widened reinforcing fiber strand was slit at an interval of 1 mm by using a separating device made of cemented carbide and further cut by using a rotary cutter made of a cemented carbide having blades disposed at an interval of 60 mm as a cutting device to prepare fibers having the length of 60 mm. By placing a tapered tube beneath the rotary cutter, the cut reinforcing fibers were conveyed to the tapered tube by flowing compressed air at 40 m/s. As a matrix resin, polycarbonate powder pulverized and classified to an average grain diameter of 500 μm (L-1225Y, "Panlite" (registered trademark), manufactured by Teijin Chemicals Ltd.) was supplied from a side of the tapered tube. Subsequently, by installing a movable conveyor net at the bottom of outlet of the tapered tube, and supplying the reinforcing fibers to the net while performing suction by a blower set below the net, a random mat having a fiber areal weight of 1230 g/m² was obtained. A form of the reinforcing fibers in the random mat was observed, and fiber axes of the reinforcing fibers were substantially parallel to the plane and were dispersed at random in the plane.

The average fiber length of the reinforcing fiber of the random mat obtained was 60 mm. The critical number of single fiber defined by the formula (1) was 87, and the average thickness of the reinforcing fiber bundle (A) defined as the bundle composed of the reinforcing fibers of the critical number of single fiber or more was 45 μm. Moreover, the number (n) of the reinforcing fiber bundles (A) per gram of the reinforcing fibers in the random mat was 300. Furthermore, in this random mat, the ratio of the reinforcing fiber bundles (A) to the total amount of the reinforcing fiber was 95 vol %.

The obtained random mat was heated at 2.0 MPa for 10 minutes in a press device heated to 300° C. so as to obtain a shaped plate having a thickness of 1.4 mm. Moreover, the number (n') of the reinforcing fiber bundle (A) defined as the bundle composed of the reinforcing fiber bundles of the critical number of single fiber or more per gram of the reinforcing fibers in the shaped plate was 330. The ultrasonic flaw detection test was conducted for the shaped plate obtained, and a portion having the reflected-wave intensity of 70% or more was observed to be 80% or more. The reinforcing fiber volume content ratio of the shaped plate obtained was found to be 50 vol %, and the coefficient of variation CV of the thickness was shown to be 7.8% according to the evaluation of the thickness unevenness of the reinforcing fiber mat in the shaped plate. Further, the results of evaluation of the tensile properties made according to JIS 7164 indicated that the tensile strength was 680 MPa, and the development rate of physical properties with respect to the theoretical strength was 72%. Moreover, the tensile modulus ratio between the 0-degree direction and the 90-degree direction was 1.08.

Example 3

As a reinforcing fiber, the PAN-based carbon fiber "Tenax" (registered trademark) manufactured by Toho Tenax Co., Ltd., STS40-24KS strand (fiber diameter: 7 μm, fiber width: 10 mm, tensile strength: 4000 MPa) was used after widened to the width of 24 mm. The widened reinforcing fiber strand was slit at an interval of 1 mm by using a separating device made of cemented carbide and further cut by using a rotary cutter made of a cemented carbide having blades disposed at an interval of 15 mm as a cutting device to prepare fibers having the length of 15 mm. By placing a tapered tube beneath the rotary cutter, the cut reinforcing fibers were conveyed to the tapered tube by flowing compressed air at 200 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 1320 g/m² was obtained. A form of the reinforcing fibers in the mat was observed, and fiber axes of the reinforcing fibers were substantially parallel to the plane and were dispersed at random in the plane. The average fiber length of the reinforcing fiber in the reinforcing fiber mat obtained was 15 mm. The critical number of single fiber defined by the formula (1) was 86, and the average thickness of the reinforcing fiber bundle (A) defined as the bundle composed of the reinforcing fibers of the critical number of single fiber or more was 35 μm. Moreover, the number (n) of the reinforcing fiber bundles (A) per gram of the reinforcing fibers in the reinforcing fiber mat was 1500. Furthermore, in this reinforcing fiber mat, the ratio of the reinforcing fiber bundles (A) to the total amount of the reinforcing fiber was 72 vol %.

Polypropylene films (F-704NP manufactured by Prime Polymer Co., Ltd., thickness: 25 μm) were layered both above and below the obtained reinforcing fiber mat to a total of 90 sheets and the random mat of the present invention was prepared. This layered body was then heated at 2.0 MPa for 10 minutes in a press device heated to 220° C. and a shaped plate having the thickness of 3.0 mm was obtained. Moreover, the number (n') of the reinforcing fiber bundle (A) defined as the bundle composed of the reinforcing fibers of the critical number of single fiber or more per gram of the reinforcing fibers in the shaped plate was 1520. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 25 vol %, and the coefficient of variation CV of the thickness was shown to be 6.1% according to the evaluation of the thickness unevenness of the reinforcing fiber mat in the shaped plate. Further, the results of evaluation of the tensile properties made according to JIS 7164 indicated that the tensile strength was 280 MPa, and the development rate of physical properties with respect to the theoretical strength was 74%. Moreover, the tensile modulus ratio between the 0-degree direction and the 90-degree direction was 1.06.

Example 4

As a reinforcing fiber, the PAN-based carbon fiber "Tenax" (registered trademark) manufactured by Toho Tenax Co., Ltd., STS40-24KS strand (fiber diameter: 7 μm, fiber width: 10 mm, tensile strength: 4000 MPa) was used after widened to the width of 30 mm. The widened reinforcing fiber strand was slit at an interval of 1 mm by using a separating device made of cemented carbide and further cut by using a rotary cutter made of a cemented carbide having blades disposed at an interval of 30 mm as a cutting device to prepare fibers having the length of 30 mm. By placing a tapered tube beneath the rotary cutter, the cut reinforcing fibers were conveyed to the tapered tube by flowing compressed air at 80 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 2800 g/m² was obtained. A form of the reinforcing fibers in the reinforcing fiber mat was observed, and fiber axes of the reinforcing fibers were substantially parallel to the plane and were dispersed at random in the plane. The average fiber length of the reinforcing fiber in the reinforcing fiber mat obtained was 30 mm. The critical number of single fiber defined by the formula (1) was 86, and the average thickness of the reinforcing fiber bundle (A) defined as the bundle composed of the reinforcing fibers of the critical number of single fiber or more was 37 µm. Moreover, the number (n) of the reinforcing fiber bundles (A) per gram of the reinforcing fibers in the reinforcing fiber mat was 1100. Furthermore, in this reinforcing fiber mat, the ratio of the reinforcing fiber bundles (A) to the total amount of the reinforcing fiber was 90 vol %.

Films of polybutylene terephthalate (500FP, "Duranex" (registered trademark), manufactured by WinTech Polymer Ltd.) were formed to have a thickness of 30 µm and were layered both above and below the reinforcing fiber mat obtained to a total of 80 sheets and the random mat of the present invention was prepared. The layered body was then heated at 2.0 MPa for 10 minutes in a press device heated to 260° C. the shaped plate having the thickness of 4.0 mm was obtained. Moreover, the number (n') of the reinforcing fiber bundle (A) defined as the bundle composed of the reinforcing fibers of the critical number of single fiber or more per gram of the reinforcing fibers in the shaped plate was 1070. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 40 vol %, and the coefficient of variation CV of the thickness was shown to be 5.3% according to the evaluation of the thickness unevenness of the reinforcing fiber mat in the shaped plate. Further, the results of evaluation of the tensile properties made according to JIS 7164 indicated that the tensile strength was 460 MPa, and the development rate of physical properties with respect to the theoretical strength was 75%. Moreover, the tensile modulus ratio between the 0-degree direction and the 90-degree direction was 1.03.

Comparative Example 1

As a reinforcing fiber, the PAN-based carbon fiber "Tenax" (registered trademark) manufactured by Toho Tenax Co., Ltd., STS40-24KS strand (fiber diameter: 7 µm, fiber width: 10 mm, tensile strength: 4000 MPa) was used after widened to the width of 24 mm. Without slitting, the widened reinforcing fiber strand was cut by using a rotary cutter made of a cemented carbide having blades disposed at an interval of 15 mm as a cutting device to prepare fibers having a length of 15 mm. By placing a tapered tube beneath the rotary cutter, the cut reinforcing fibers were conveyed to the tapered tube by flowing compressed air at 250 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 1320 g/m² was obtained. A form of the reinforcing fibers in the reinforcing fiber mat was observed, and fiber axes of the reinforcing fibers were substantially parallel to the plane and were dispersed at random in the plane. The average fiber length of the reinforcing fiber in the reinforcing fiber mat obtained was 15 mm. The critical number of single fiber defined by the formula (1) was 86, and the average thickness of the reinforcing fiber bundle (A) defined as the bundle composed of the reinforcing fibers of the critical number of single fiber or more was 47 µm. Moreover, the number (n) of the reinforcing fiber bundle (A) defined as the bundle composed of the reinforcing fibers of the critical number of single fiber or more per gram of the reinforcing fibers in the reinforcing fiber mat was 420. Furthermore, in this reinforcing fiber mat, the ratio of the reinforcing fiber bundles (A) to the total amount of the reinforcing fiber was 70 vol %.

Polypropylene films (F-704NP manufactured by Prime Polymer Co., Ltd., thickness: 25 µm) were layered both above and below the obtained reinforcing fiber mat to a total of 90 sheets and then heated at 2.0 MPa for 10 minutes in a press device heated to 220° C. and a shaped plate having the thickness of 3.0 mm was obtained. Moreover, the number (n') of the reinforcing fiber bundle (A) defined as the bundle composed of the reinforcing fibers of the critical number of single fiber or more per gram of the reinforcing fibers in the shaped plate was 400. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 25 vol %, and the coefficient of variation CV of the thickness was shown to be 18.0% according to the evaluation of the thickness unevenness of the reinforcing fiber mat in the shaped plate. Further, the results of evaluation of the tensile properties made according to JIS 7164 indicated that the tensile strength was 230 MPa, and the development rate of physical properties with respect to the theoretical strength was 62%. Moreover, the tensile modulus ratio between the 0-degree direction and the 90-degree direction was 1.10.

Comparative Example 2

As a reinforcing fiber, the PAN-based carbon fiber "Tenax" (registered trademark) manufactured by Toho Tenax Co., Ltd., STS40-24KS strand (fiber diameter: 7 µm, fiber width: 10 mm, tensile strength: 4000 MPa) was used. The reinforcing fiber strand was slit at an interval of 0.7 mm by using a separating device made of cemented carbide and further cut by using a rotary cutter made of a cemented carbide having blades disposed at an interval of 30 mm as a cutting device to prepare fibers having the length of 30 mm. By placing a tapered tube beneath the rotary cutter, the cut reinforcing fibers were conveyed to the tapered tube by flowing compressed air at 50 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 2800 g/m² was obtained. A form of the reinforcing fibers in the reinforcing fiber mat was observed, and fiber axes of the reinforcing fibers were substantially parallel to the plane and were dispersed at random in the plane. The average fiber length of the reinforcing fiber in the reinforcing fiber mat obtained was 30 mm. The critical number of single fiber defined by the formula (1) was 86, and the average thickness of the reinforcing fiber bundle (A) defined as the bundle composed of the reinforcing fibers of the critical number of single fiber or more of single fibers was 116 µm. Moreover, the number (n) of the reinforcing fiber bundle (A) defined as the bundle composed of the critical number of single fiber or more of single fibers per gram of the reinforcing fibers in the reinforcing fiber mat was 580. Furthermore, in this reinforcing fiber mat, the ratio of the reinforcing fiber bundles (A) to the total amount of the reinforcing fiber was 86 vol %.

Films of polybutylene terephthalate (500FP, "Duranex" (registered trademark), manufactured by WinTech Polymer Ltd.) were formed to have a thickness of 30 μm and were layered both above and below the reinforcing fiber mat obtained to a total of 80 sheets and then heated at 2.0 MPa for 10 minutes in a press device heated to 260° C. the shaped plate having the thickness of 4.0 mm was obtained. Moreover, the number (n') of the reinforcing fiber bundle (A) defined as the bundle composed of the reinforcing fibers of the critical number of single fiber or more per gram of the reinforcing fibers in the shaped plate was 620. The ultrasonic flaw detection test was conducted for the shaped plate obtained, and a portion having the reflected-wave intensity of 70% or more was observed to occupy 58% of the inside of the shaped plate, and a non-impregnated portion was confirmed.

The reinforcing fiber volume content ratio of the shaped plate obtained was found to be 39 vol %, and the coefficient of variation CV of the thickness was shown to be 13.6% according to the evaluation of the thickness unevenness of the reinforcing fiber mat in the shaped plate. Further, the results of evaluation of the tensile properties made according to JIS 7164 indicated that the tensile strength was 360 MPa, and the development rate of physical properties with respect to the theoretical strength was 60%. Moreover, the tensile modulus ratio between the 0-degree direction and the 90-degree direction was 1.07.

Example 5

As a reinforcing fiber, the PAN-based carbon fiber "Tenax" (registered trademark) manufactured by Toho Tenax Co., Ltd., STS40-24K strand (fiber diameter: 7 μm, fiber width: 10 mm, tensile strength: 4000 MPa) was used after widened to the width of 20 mm. The widened reinforcing fiber strand was slit at an interval of 1 mm by using a separating device made of cemented carbide and further cut by using a rotary cutter made of a cemented carbide having blades disposed at an interval of 10 mm as a cutting device to prepare fibers having the length of 10 mm. By placing a tapered tube beneath the rotary cutter, the cut reinforcing fibers were conveyed to the tapered tube by flowing compressed air at 40 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 2640 g/m² was obtained. A form of the reinforcing fibers in the reinforcing fiber mat was observed, and fiber axes of the reinforcing fibers were substantially parallel to the plane and were dispersed at random in the plane.

The average fiber length of the reinforcing fiber in the reinforcing fiber mat obtained was 10 mm. The critical number of single fiber defined by the formula (1) was 86, and the average thickness of the reinforcing fiber bundle (A) defined as the bundle composed of the reinforcing fibers of the critical number of single fiber or more was 58 μm. Moreover, the number (n) of the reinforcing fiber bundles (A) per gram of the reinforcing fibers in the reinforcing fiber mat was 1350. Furthermore, in this reinforcing fiber mat, the ratio of the reinforcing fiber bundles (A) to the total amount of the reinforcing fiber was 90 vol %.

By performing an operation similar to that in Example 4, polybutylene terephthalate films were layered both above and below to a total of 50 sheets and a shaped plate having the thickness of 3.0 mm was obtained. Moreover, the number (n') of the reinforcing fiber bundle (A) defined as the bundle composed of the reinforcing fibers of the critical number of single fiber or more per gram of the reinforcing fibers in the shaped plate was 1390. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 50 vol %, and the coefficient of variation CV of the thickness was shown to be 8.0% according to the evaluation of the thickness unevenness of the reinforcing fiber mat in the shaped plate. Further, the results of evaluation of the tensile properties made according to JIS 7164 indicated that the tensile strength was 530 MPa, and the development rate of physical properties with respect to the theoretical strength was 71%. Moreover, the tensile modulus ratio between the 0-degree direction and the 90-degree direction was 1.07.

Example 6

As a reinforcing fiber, the PAN-based carbon fiber "Tenax" (registered trademark) manufactured by Toho Tenax Co., Ltd., UTS50-24K strand (fiber diameter: 6.9 μm, fiber width: 10 mm, tensile strength: 5000 MPa) was used after widened to the width of 30 mm. The widened reinforcing fiber strand was slit at an interval of 0.7 mm by using a separating device made of cemented carbide and further cut by using a rotary cutter made of a cemented carbide having blades disposed at an interval of 10 mm as a cutting device to prepare fibers having the length of 10 mm. By placing a tapered tube beneath the rotary cutter, the cut reinforcing fibers were conveyed to the tapered tube by flowing compressed air at 40 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 2380 g/m² was obtained. A form of the reinforcing fibers in the reinforcing fiber mat was observed, and fiber axes of the reinforcing fibers were substantially parallel to the plane and were dispersed at random in the plane. The average fiber length of the reinforcing fiber in the reinforcing fiber mat obtained was 10 mm. The critical number of single fiber defined by the formula (1) was 87, and the average thickness of the reinforcing fiber bundle (A) defined as the bundle composed of the reinforcing fibers of the critical number of single fiber or more was 37 μm. Moreover, the number (n) of the reinforcing fiber bundles (A) per gram of the reinforcing fibers in the reinforcing fiber mat was 2400. Furthermore, in this reinforcing fiber mat, the ratio of the reinforcing fiber bundles (A) to the total amount of the reinforcing fiber was 80 vol %.

By performing an operation similar to that in Example 4, polybutylene terephthalate films were layered both above and below to a total of 55 sheets and a shaped plate having the thickness of 3.0 mm was obtained. Moreover, the number (n') of the reinforcing fiber bundle (A) defined as the bundle composed of the reinforcing fibers of the critical number of single fiber or more per gram of the reinforcing fibers in the shaped plate was 2440. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 45 vol %, and the coefficient of variation CV of the thickness was shown to be 4.3% according to the evaluation of the thickness unevenness of the reinforcing fiber mat in the shaped plate. Further, the results of evaluation of the tensile properties made according to JIS 7164 indicated that the tensile strength was 630 MPa, and the development rate of physical properties with respect to the theoretical strength was 75%. Moreover, the tensile modulus ratio between the 0-degree direction and the 90-degree direction was 1.04.

Example 7

As a reinforcing fiber, the PAN-based carbon fiber "Tenax" (registered trademark) manufactured by Toho Tenax Co., Ltd., HTS40-12K strand (fiber diameter: 7 μm, fiber width: 10 mm, tensile strength: 4200 MPa) was used. The reinforcing fiber strand was slit at an interval of 1.2 mm by using a separating device made of cemented carbide and further cut by using a rotary cutter made of a cemented carbide having blades disposed at an interval of 15 mm as a cutting device to prepare fibers having the length of 15 mm. By placing a tapered tube beneath the rotary cutter, the cut reinforcing fibers were conveyed to the tapered tube by flowing compressed air at 160 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 2380 g/m² was obtained. A form of the reinforcing fibers in the mat was observed, and fiber axes of the reinforcing fibers were substantially parallel to the plane and were dispersed at random in the plane. The average fiber length of the reinforcing fiber in the reinforcing fiber mat obtained was 15 mm. The critical number of single fiber defined by the formula (1) was 86, and the average thickness of the reinforcing fiber bundle (A) defined as the bundle composed of the reinforcing fibers the critical number of single fiber or more was 56 μm. Moreover, the number (n) of the reinforcing fiber bundles (A) per gram of the reinforcing fibers in the reinforcing fiber mat was 580. Furthermore, in this reinforcing fiber mat, the ratio of the reinforcing fiber bundles (A) to the total amount of the reinforcing fiber was 75 vol %.

In the manner similar to Example 3, polypropylene films were layered both above and below to a total of 65 sheets and a shaped plate having the thickness of 3.0 mm was obtained. Moreover, the number (n') of the reinforcing fiber bundle (A) defined as the bundle composed of the reinforcing fibers of the critical number of single fiber or more per gram of the reinforcing fibers in the shaped plate was 590. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 45 vol %, and the coefficient of variation CV of the thickness was shown to be 10.6% according to the evaluation of the thickness unevenness of the reinforcing fiber mat in the shaped plate. Further, the results of evaluation of the tensile properties made according to JIS 7164 indicated that the tensile strength was 470 MPa, and the development rate of physical properties with respect to the theoretical strength was 66%. Moreover, the tensile modulus ratio between the 0-degree direction and the 90-degree direction was 1.08.

Example 8

As a reinforcing fiber, the PAN-based carbon fiber "Tenax" (registered trademark) manufactured by Toho Tenax Co., Ltd., UTS50-24K strand (fiber diameter: 6.9 μm, fiber width: 10 mm, tensile strength: 5000 MPa) was used after widened to the width of 30 mm. The widened reinforcing fiber strand was slit at an interval of 1 mm by using a separating device made of cemented carbide and further cut by using a rotary cutter made of a cemented carbide having blades disposed at an interval of 30 mm as a cutting device to prepare fibers having the length of 30 mm. By placing a tapered tube beneath the rotary cutter, the cut reinforcing fibers were conveyed to the tapered tube by flowing compressed air at 250 m/s. As a matrix resin, polyamide-6 resin (A1030, polyamide 6, manufactured by UNITIKA Ltd.) crushed to an average grain diameter of 500 μm was supplied from a side of the tapered tube. Subsequently, by installing a movable conveyor net at the bottom of outlet of the tapered tube, and supplying the reinforcing fibers to the net while performing suction by a blower set below the net, a random mat having a fiber areal weight of 2110 g/m² was obtained. A form of the reinforcing fibers in the random mat was observed, and fiber axes of the reinforcing fibers were substantially parallel to the plane and were dispersed at random in the plane.

The average fiber length in the reinforcing fiber of the random mat obtained was 30 mm. The critical number of single fiber defined by the formula (1) was 87, and the average thickness of the reinforcing fiber bundle (A) defined as the bundle composed of the reinforcing fibers of the critical number of single fiber or more was 34 μm. Moreover, the number (n) of the reinforcing fiber bundle (A) defined as the bundle composed of the reinforcing fibers of the critical number of single fiber or more per gram of the reinforcing fibers in the random mat was 600. Furthermore, in this random mat, the ratio of the reinforcing fiber bundles (A) to the total amount of the reinforcing fiber was 60 vol %.

The obtained random mat was heated at 2.0 MPa for 10 minutes in a press device heated to 260° C. so as to obtain a shaped plate having a thickness of 3.0 mm. Moreover, the number (n') of the reinforcing fiber bundle (A) defined as the bundle composed of the reinforcing fibers of the critical number of single fiber or more per gram of the reinforcing fibers in the shaped plate was 630. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 40 vol %, and the coefficient of variation CV of the thickness was shown to be 7.4% according to the evaluation of the thickness unevenness of the reinforcing fiber mat in the shaped plate. Further, the results of evaluation of the tensile properties made according to JIS 7164 indicated that the tensile strength was 550 MPa, and the development rate of physical properties with respect to the theoretical strength was 73%. Moreover, the tensile modulus ratio between the 0-degree direction and the 90-degree direction was 1.08.

Comparative Example 3

As a reinforcing fiber, the PAN-based carbon fiber "Tenax" (registered trademark) manufactured by Toho Tenax Co., Ltd., STS40-24K strand (fiber diameter: 7 μm, fiber width: 10 mm, tensile strength: 4000 MPa) was used. As the cutting device, a rotary cutter provided with knives disposed at an angle of 90° against the circumferential direction, wherein each knife having a blade width of 1 mm was arranged at a pitch of 15 mm in the circumferential direction and the adjacent knives were offset from each other by 1 mm, was used to cut the reinforcing fiber strand to be a fiber length of 15 mm.

By placing a tapered tube beneath the rotary cutter, the cut reinforcing fibers were conveyed to the tapered tube by flowing compressed air at 300 m/s. Subsequently, by installing a movable conveyor net at the bottom of outlet of the tapered tube, and supplying the reinforcing fibers to the net while performing suction by a blower set below the net, a reinforcing fiber mat having a fiber areal weight of 2380 g/m$^2$ was obtained. A form of the reinforcing fibers in the mat was observed, and fiber axes of the reinforcing fibers were substantially parallel to the plane and were dispersed at random in the plane. The average fiber length of the reinforcing fiber in the reinforcing fiber mat obtained was 15 mm. The critical number of single fiber defined by the formula (1) was 86, and the average thickness of the reinforcing fiber bundle (A) defined as the bundle composed of the reinforcing fibers of the critical number of single fiber or more was 108 µm. Moreover, the number (n) of the reinforcing fiber bundles (A) per gram of the reinforcing fibers in the reinforcing fiber mat was 280. Furthermore, in this reinforcing fiber mat, the ratio of the reinforcing fiber bundles (A) to the total amount of the reinforcing fiber was 52 vol %.

By performing an operation similar to that in Example 3, polypropylene films were layered both above and below to a total of 65 sheets and a shaped plate having the thickness of 3.1 mm was obtained. Moreover, the number (n') of the reinforcing fiber bundle (A) defined as the bundle composed of the reinforcing fibers of the critical number of single fiber or more per gram of the reinforcing fibers in the shaped plate was 290. The ultrasonic flaw detection test was conducted for the shaped plate obtained, and a portion having the reflected-wave intensity of 70% or more was observed to occupy 54% of the inside of the shaped plate, and a non-impregnated portion was confirmed.

The reinforcing fiber volume content ratio of the shaped plate obtained was found to be 44 vol %, and the coefficient of variation CV of the thickness was shown to be 19.2% according to the evaluation of the thickness unevenness of the reinforcing fiber mat in the shaped plate. Further, the results of evaluation of the tensile properties made according to JIS 7164 indicated that the tensile strength was 370 MPa, and the development rate of physical properties with respect to the theoretical strength was 56%. Moreover, the tensile modulus ratio between the 0-degree direction and the 90-degree direction was 1.12.

Comparative Example 4

As a reinforcing fiber, the PAN-based carbon fiber "Tenax" (registered trademark) manufactured by Toho Tenax Co., Ltd., UTS50-24K strand (fiber diameter: 6.9 µm, fiber width: 10 mm, tensile strength: 5000 MPa) was used after widened to the width of 20 mm. The widened reinforcing fiber strand was slit at an interval of 2 mm by using a separating device made of cemented carbide and further cut by using a rotary cutter made of a cemented carbide having blades disposed at an interval of 30 mm as a cutting device to prepare fibers having the length of 30 mm. By placing a tapered tube beneath the rotary cutter, the cut reinforcing fibers were conveyed to the tapered tube by flowing compressed air at 160 m/s. In the manner similar to Example 8, the polyamide-6 resin was supplied from a side of the tapered tube and the random mat with the reinforcing fiber areal weight of 2110 g/m$^2$ was obtained. A form of the reinforcing fibers in the random mat was observed, and fiber axes of the reinforcing fibers were substantially parallel to the plane and were dispersed at random in the plane.

The average fiber length of the reinforcing fiber in the random mat obtained was 30 mm. The critical number of single fiber defined by the formula (1) was 87, and the average thickness of the reinforcing fiber bundle (A) defined as the bundle composed of the reinforcing fibers of the critical number of single fiber or more was 60 µm. Moreover, the number (n) of the reinforcing fiber bundle (A) defined as the bundle composed of the reinforcing fibers of the critical number of single fiber or more per gram of the reinforcing fibers in the random mat was 200. Furthermore, in this random mat, the ratio of the reinforcing fiber bundles (A) to the total amount of the reinforcing fiber was 70 vol %.

By molding the random mat obtained in the manner similar to Example 8, a shaped plate having a thickness of 3.0 mm was obtained. Moreover, the number (n') of the reinforcing fiber bundle (A) defined as the bundle composed of the reinforcing fibers of the critical number of single fiber or more per gram of the reinforcing fibers in the shaped plate was 190. The ultrasonic flaw detection test was conducted for the shaped plate obtained, and a portion having the reflected-wave intensity of 70% or more was observed to be 80% or more.

The reinforcing fiber volume content ratio of the shaped plate obtained was found to be 40 vol %, and the coefficient of variation CV of the thickness was shown to be 21.0% according to the evaluation of the thickness unevenness of the reinforcing fiber mat in the shaped plate. Further, the results of evaluation of the tensile properties made according to JIS 7164 indicated that the tensile strength was 440 MPa, and the development rate of physical properties with respect to the theoretical strength was 59%. Moreover, the tensile modulus ratio between the 0-degree direction and the 90-degree direction was 1.14.

INDUSTRIAL APPLICABILITY

According to the present invention, the fiber-reinforced composite material shaped product which exhibits high mechanical strength, excellent isotropy, and high development rate of strength can be obtained. Moreover, the fiber-reinforced composite material shaped product obtained by the present invention can be made thin-walled and thus, it can be used for various component members, that is, internal plates, external plates, and component members of an automobile, and frames, housings and the like of various electrical products and machines.

The present invention was explained in detail by referring to specific embodiments, but it is obvious for those skilled in the art that various changes and modifications can be applied without departing from the spirit and range of the present invention.

The present application is based on the Japanese Patent Application (Japanese Patent Application No. 2012-165871) filed on Jul. 26, 2012 and the contents thereof are incorporated herein by reference.

REFERENCE SIGNS LIST

1. Carbon fiber
2. Pinch roller
3. Rubber roller
4. Rotary cutter body
5. Blade
6. Cut carbon fiber 7. Angle formed by circumferential direction and blade alignment

The invention claimed is:

1. A random mat comprising: reinforcing fibers having an average fiber length of 3 to 100 mm; and a thermoplastic resin,
wherein the reinforcing fibers contain a reinforcing fiber bundle (A) composed of the reinforcing fibers of a critical number of single fiber (defined by the following formula (1)) or more,
an average thickness of the reinforcing fiber bundles (A) is 100 μm or less, and
a number (n) of the reinforcing fiber bundles (A) per unit weight (g) of the reinforcing fibers satisfies the following formula (I):

$$\text{Critical number of single fiber} = 600/D \tag{1}$$

wherein D is the average fiber diameter (μm) of single reinforcing fibers:

$$0.65 \times 10^4/L < n \tag{I}$$

wherein L is the average fiber length (mm) of single reinforcing fibers.

2. The random mat according to claim 1,
wherein the number (n) of the reinforcing fiber bundles (A) per unit weight (g) in the reinforcing fibers satisfies the following formula (I-2):

$$1.2 \times 10^4/L < n < 18.0 \times 10^4/L \tag{I-2}$$

wherein L is the average fiber length (mm) of single reinforcing fibers.

3. The random mat according to claim 1,
wherein a content ratio of the reinforcing fiber bundles (A) to a total amount of the reinforcing fiber is 20 vol % or more and 99 vol % or less.

4. The random mat according to claim 1,
wherein the reinforcing fibers are at least one type selected from a group consisting of a carbon fiber, an aramid fiber, and a glass fiber.

5. The random mat according to claim 1,
wherein an amount of the thermoplastic resin present in the random mat is 10 to 800 weight parts with respect to 100 weight parts of the reinforcing fibers.

6. The random mat according to claim 1, having a reinforcing fiber areal weight is 25 to 10000 g/m².

7. A fiber-reinforced composite material obtained by molding the random mat according to claim 1.

8. A fiber-reinforced composite material shaped product comprising: reinforcing fibers having an average fiber length of 3 to 100 mm; and a thermoplastic resin,
wherein the reinforcing fibers contain a reinforcing fiber bundle (A) composed of the reinforcing fibers of a critical number of single fiber (defined by the following formula (1)) or more,
an average thickness of the reinforcing fiber bundles (A) is 100 μm or less,
a number (n') of the reinforcing fiber bundles (A) per unit weight (g) of the reinforcing fibers satisfies the following formula (II), and
an amount of the thermoplastic resin present is 10 to 800 weight parts with respect to 100 weight parts of the reinforcing fibers:

$$\text{Critical number of single fiber} = 600/D \tag{1}$$

wherein D is the average fiber diameter (μm) of single reinforcing fibers:

$$0.65 \times 10^4/L < n' \tag{II}$$

wherein L is the average fiber length (mm) of single reinforcing fibers.

9. The random mat according to claim 1, wherein the reinforcing fiber bundles (A) have an average thickness of 20 to 75 μm.

10. The random mat according to claim 1, wherein the number (n) of the reinforcing fiber bundles (A) per unit weight (g) of the reinforcing fibers in the random mat satisfies the following formula (1-3):

$$1.5 \times 10^4/L < n < 12.0 \times 10^4/L \tag{1-3}$$

wherein L is an average fiber length (mm) of the reinforcing fibers.

* * * * *